(12) United States Patent  
Greason et al.

(10) Patent No.: US 7,900,435 B1
(45) Date of Patent: Mar. 8, 2011

(54) MICRO-COAXIAL INJECTOR FOR ROCKET ENGINE

(75) Inventors: Jeffrey K. Greason, Tehachapi, CA (US); Douglas B. Jones, Mojave, CA (US); Daniel L. DeLong, Mojave, CA (US)

(73) Assignee: XCOR Aerospace, Mojave, CA (US)

( * ) Notice: Subject to any disclaimer, the term of this patent is extended or adjusted under 35 U.S.C. 154(b) by 877 days.

(21) Appl. No.: 11/752,866

(22) Filed: May 23, 2007

(51) Int. Cl.
*F02K 9/00* (2006.01)

(52) U.S. Cl. .......................................... 60/258; 60/211

(58) Field of Classification Search .................... 60/211, 60/257, 258, 740; 239/418, 423, 558
See application file for complete search history.

(56) References Cited

U.S. PATENT DOCUMENTS

| | | | | |
|---|---|---|---|---|
| 3,079,179 A * | 2/1963 | Niemoth | ..................... | 285/124.2 |
| 3,112,988 A * | 12/1963 | Coldren et al. | ................... | 431/8 |
| 4,644,745 A * | 2/1987 | Wagner | ........................... | 60/258 |
| 4,967,561 A * | 11/1990 | Bruhwiler et al. | .............. | 60/737 |
| 5,265,415 A * | 11/1993 | Cox, Jr. | .......................... | 60/258 |
| 5,660,039 A * | 8/1997 | Sion et al. | ....................... | 60/258 |
| 6,116,020 A | 9/2000 | Cornelius et al. | | |
| 6,145,299 A | 11/2000 | Fasano | | |
| 6,244,041 B1 * | 6/2001 | Vasin et al. | ..................... | 60/258 |
| 6,253,539 B1 * | 7/2001 | Farhangi et al. | ................. | 60/211 |
| 6,769,242 B1 * | 8/2004 | Balepin | ........................... | 60/204 |
| 6,829,884 B2 | 12/2004 | Fint et al. | | |
| 6,915,627 B2 | 7/2005 | Calabro | | |
| 7,124,574 B2 * | 10/2006 | Horn et al. | ...................... | 60/258 |
| 7,155,898 B2 | 1/2007 | Sota, Jr. et al. | | |
| 7,343,745 B2 * | 3/2008 | Inoue et al. | ..................... | 60/737 |
| 7,621,119 B2 * | 11/2009 | Brown et al. | .................... | 60/257 |
| 2004/0231318 A1 * | 11/2004 | Fisher | ............................. | 60/258 |
| 2009/0320447 A1 * | 12/2009 | Fisher | ............................. | 60/258 |

OTHER PUBLICATIONS

Chemical Propulsion Information Agency, "Guidelines for Combustion Stability Specification and Verification Procedures for Liquid Propellant Rocket Engines", CPIA Publication 655, Jan. 1997, 20pp.
Stein, Samuel, "Technical Note D-126, A High-Performance 250-Pound-Thrust Rocket Engine Utilizing Coaxial-Flow Injection of JP-4 Fuel and Liquid Oxygen", National Aeronautics and Space Administration, Oct. 1959, 16pp.

* cited by examiner

*Primary Examiner* — Michael Cuff
*Assistant Examiner* — Phutthiwat Wongwian
(74) *Attorney, Agent, or Firm* — McDermott Will & Emery LLP

(57) ABSTRACT

An improved coaxial injector for injecting first and second propellants into a combustion chamber of a rocket engine is provided. The injector includes a first plate, a second plate, a plurality of channels formed in the first plate, and a plurality of tubes extending through the second plate and into the plurality of channels. The tubes inject a first propellant, such as an oxidizer, into the combustion chamber, and the channels inject a second propellant, such as a fuel, around the tubes and into the combustion chamber.

21 Claims, 10 Drawing Sheets

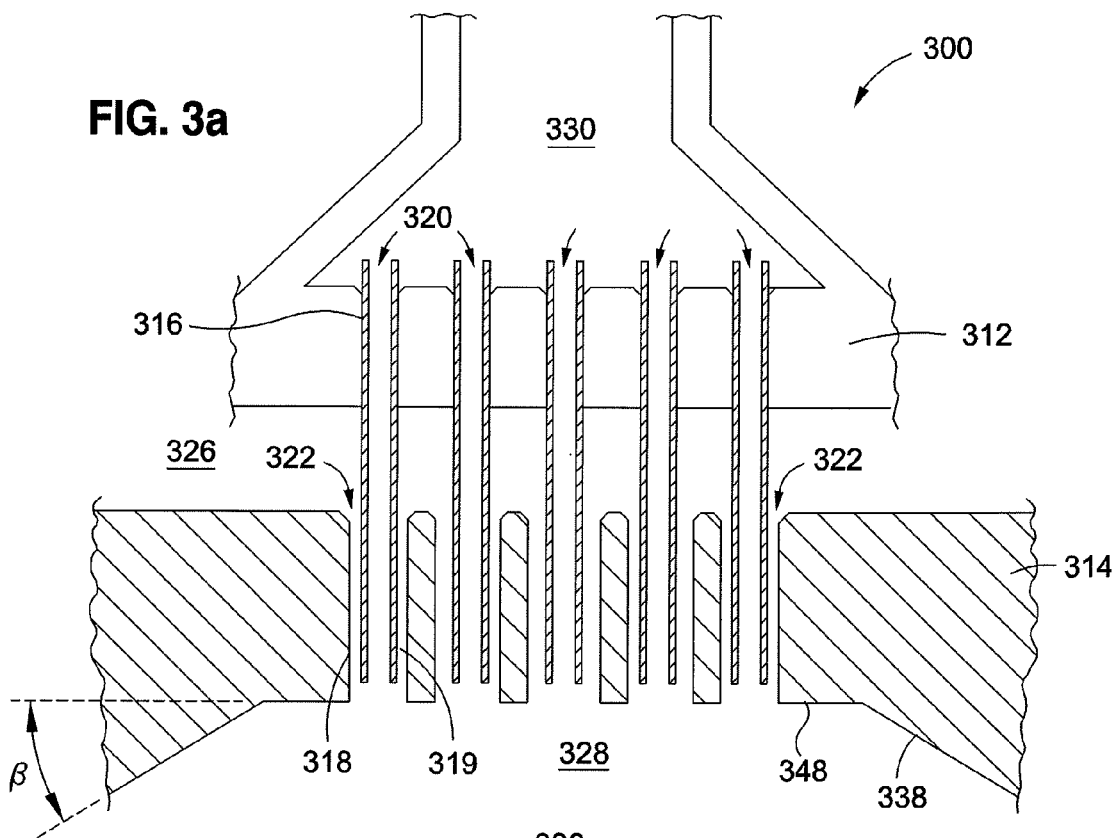
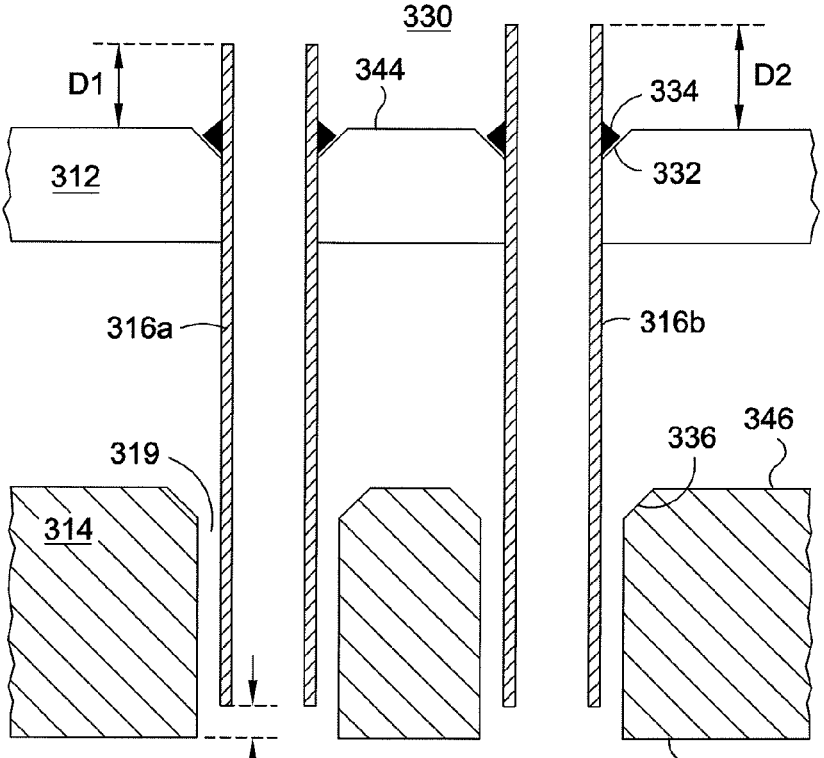

MICRO-COAXIAL INJECTOR FOR ROCKET ENGINE

FIELD OF THE INVENTION

The present invention relates to injectors for rocket engines, and more particularly to micro-coaxial injectors for liquid-propellant rocket engines.

BACKGROUND

Liquid rocket engines operate by injecting liquid propellants into a combustion chamber where the propellants are ignited and combusted at high pressure and expelled to provide thrust. An injector is used to inject the liquid propellants, typically an oxidizer and a fuel, into the combustion chamber. The injector rapidly atomizes the liquid propellants into small droplets to promote efficient mixture and complete combustion.

Injectors for liquid rocket engines should be "stable," or resistant to combustion instability. Combustion stability is discussed in detail in Chemical Propulsion Information Agency, "Combustion Stability Specifications and Verification Procedures," CPIA Publication 655, January 1997. Combustion instability arises when pressure oscillations resonate in the combustion chamber and increase in magnitude until the chamber structurally fails. The oscillations grow due to positive feedback from the injector. In order to inject the oxidizer and fuel into the combustion chamber, the injector depends on a pressure difference between the fuel and oxidizer reservoirs (which could be tanks, pumps, or other vessels) and the combustion chamber. A higher pressure in the reservoirs causes the fuel and oxidizer to flow into the chamber. However, when pressure builds inside the combustion chamber, the pressure increase reduces the relative pressure difference across the injector (between the injector and the chamber), thereby reducing the flow of oxidizer and fuel into the chamber. When the fuel and oxidizer flow decreases, the pressure in the chamber drops. The resulting reduced pressure in the combustion chamber causes the opposite effect. The flow of fuel and oxidizer from the injector into the chamber increases, leading to another buildup of pressure. The flow of fuel and oxidizer thus contributes to the positive feedback of the pressure wave inside the combustion chamber, creating a resonant effect that can lead to catastrophic failure. The theory of combustion instability is described more fully in "Liquid Propellant Rocket Combustion Instability," NASA SP-194, Washington D.C., 1972.

Thus, a stable injector is very desirable for a rocket engine. Several styles of injectors for liquid rocket engines are known in the art. Two examples are impinging jets and coaxial post injectors. An impinging jet injector incorporates alternating first and second sets of channels leading into the combustion chamber. The oxidizer is introduced through one set of channels, and the fuel through the other. The channels may be aimed at each other to direct the two propellants into each other as they enter the combustion chamber, to promote complete mixing. Impinging jet injectors require complicated and expensive machined parts to incorporate the various channels and jets and to keep the propellants separate until they are injected into the chamber. An example of an impinging jet injector is disclosed in U.S. Pat. No. 6,116,020 to Cornelius et al.

A coaxial post injector injects one propellant, typically but not necessarily the oxidizer, through a tube into the combustion chamber. The second propellant is injected through a channel surrounding the tube. Both propellants are thus injected around the same axis. The tubes in coaxial post injectors are relatively large, five or more millimeters in diameter, and they are rigid and stiff. The injector may include multiple tubes and channels spread across the injector face. An example of this type of prior art injector is shown in FIGS. 1a-1b. The prior art coaxial injector 100 includes an upper plate 112 housing a tube 116. The tube is attached to the upper plate 112 with a fastener 124 such as a screw, or by other methods of fastening such as brazing. The tube 116 extends down through the fuel plenum 126 into a channel 118 which is formed in the lower plate 114. The channel 118 is larger than the tube 116, so that an open annular region 119 is formed around the tube 116. The oxidizer 120 flows through the tube 116 into the combustion chamber 128. The fuel 122 in the fuel plenum 126 flows through the annular region 119 into the combustion chamber 128, where it mixes with the oxidizer 120. The two plates 112 and 114 may be machined, welded, or brazed together so that the tube 116 is centered in the channel 118, forming the annular region 119. The injector 100 requires complex centering features (for simplicity, not shown in FIGS. 1a-1b) in order to center the large, rigid tube inside the channel. When the tube is centered and the two plates are brazed together, the plates cannot be disassembled. The plates 112 and 114 are expensive to manufacture and maintain.

A typical micro-coaxial injector is disclosed in Samuel Stein, A High-Performance 250-Pound-Thrust Rocket Engine Utilizing Coaxial-Flow Injection of JP-4 Fuel and Liquid Oxygen, NASA TN D-126 (October 1959). An example of a prior art micro-coaxial injector is shown in FIGS. 2a-2b. The prior art micro-coaxial injector 200 employs injector tubes 216 with relatively longer lengths and smaller diameters as compared to the coaxial post injector. The injector tubes 216 have a higher length to outside diameter ratio than coaxial post injector tubes. This high ratio, approximately 6 or higher, provides less rigidity in the tubes, so that they are able to deflect elastically over a reasonable range of motion. The high ratio also reduces the need for the tubes to be exactly centered within the channels 218 through which the fuel 222 flows. In addition, the oxidizer flow through the tubes remains acceptably straight even when the tubes 216 are not aligned in the center of the channels 218. The micro-coaxial injector 200 thus reduces the need for complicated centering mechanisms.

A disadvantage of prior art micro-coaxial injectors is that the smaller elements require very tight manufacturing tolerances. As a result, these injectors can have problems controlling the distribution of the mass flow of the propellants to ensure good combustion stability and high efficiency. Therefore, there is a need for an improved micro-coaxial injector that can improve combustion stability and efficiency and reduce manufacturing costs.

SUMMARY

The present invention relates to injectors for rocket engines, and more particularly to micro-coaxial injectors for liquid-propellant rocket engines. In one embodiment, a micro-coaxial injector for a rocket engine having a combustion chamber includes a first plate; a plurality of channels formed in the first plate; a second plate having a first surface facing the first plate and having a second surface facing opposite the first plate; and a plurality of tubes extending through the second plate and into the plurality of channels and configured to inject a first propellant into the combustion chamber, each of the plurality of tubes extending past the second surface of the second plate. The plurality of channels is configured to inject a second propellant into the combustion chamber. A surface of the first plate facing the second plate comprises a chamfer formed around each of the plurality of channels.

In one embodiment, an injector for a rocket engine having a combustion chamber includes a first plate having a center section; a plurality of channels formed in the first plate and arranged in an alternating pattern around the center section of the first plate; a second plate; and a plurality of tubes extending through the second plate and into the plurality of channels and configured to inject a first propellant into the combustion chamber. The plurality of channels is configured to inject a second propellant into the combustion chamber.

In one embodiment, an injector for a rocket engine having a combustion chamber includes a first plate having a perimeter section, wherein at least a portion of the perimeter section has a conical shape; a plurality of channels formed in the first plate inside the perimeter section of the first plate; a second plate; and a plurality of tubes extending through the second plate and into the plurality of channels and configured to inject a first propellant into the combustion chamber. The plurality of channels is configured to inject a second propellant into the combustion chamber.

In one embodiment, a micro-coaxial injector for a rocket engine having a combustion chamber includes a first plate; a plurality of channels formed in the first plate; a second plate having a first surface facing the first plate and a second surface facing opposite the first plate; and a plurality of tubes extending through the second plate and into the plurality of channels and configured to inject a first propellant into the combustion chamber and configured to impart a rotational velocity to the first propellant. The plurality of channels is configured to inject a second propellant into the combustion chamber.

BRIEF DESCRIPTION OF THE DRAWINGS

These and other features and advantages of the present invention will become appreciated as the same become better understood with reference to the specification, claims and appended drawings wherein:

FIG. 3a is a cross-sectional side view of an injector according to one embodiment of the invention;

FIG. 3b is a closer view of the injector of FIG. 3a;

FIG. 8b is a top view of the injector of FIG. 8a.

DETAILED DESCRIPTION

Figure 1A:
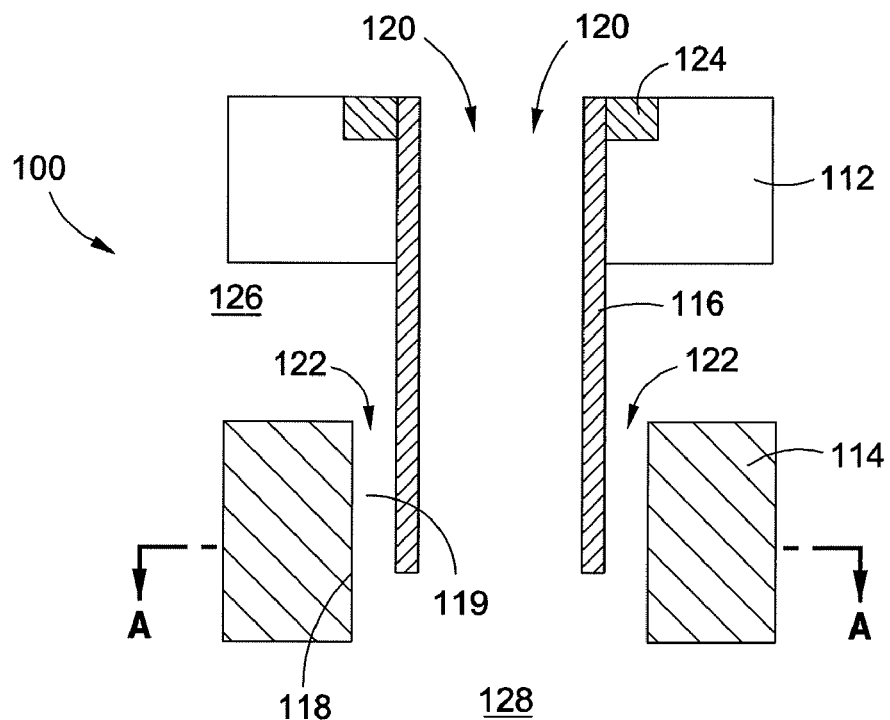
FIG. 1a is a cross-sectional side view of a prior art coaxial post injector.
Figure 1B:
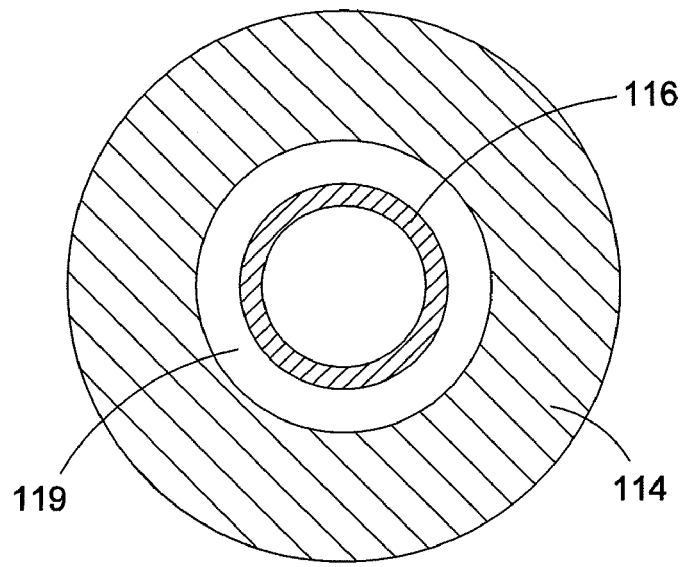
FIG. 1b is a cross-sectional top view of the prior art coaxial injector of FIG. 1a taken along the line A-A.

The detailed description set forth below in connection with the appended drawings is intended as a description of the presently preferred embodiments of an injector provided in accordance with the invention and is not intended to represent the only forms in which the invention may be constructed or utilized. The description sets forth the features of the invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The present invention relates to injectors for rocket engines, and more particularly to micro-coaxial injectors for liquid-propellant rocket engines. The embodiments of the injector of the present invention provide an improved design of the tubes, channels, upper plate, and lower plate. In one embodiment of the invention, the injector tubes are reentrant, meaning that they extend into the oxidizer manifold above the top surface of the upper plate, instead of being flush with the top surface. The flow of oxidizer through the tubes is less sensitive to small variations in reentrant tubes than in flush tubes. Tubes that are flush with the top surface of the upper plate have tight manufacturing tolerances because small variations in the tubes' geometry affect the flow resistance. The use of reentrant tubes can reduce the injector's sensitivity to manufacturing tolerances, because small differences in the geometry are less important, making it less expensive to manufacture.

In one embodiment of the invention, the lower plate includes a chamfer formed around each channel. The chamfer increases the flow coefficient of the annular region of the channel around the tube and facilitates assembly of the tubes into the channels. In one embodiment of the invention, the tubes and corresponding channels are arranged on the lower plate in an alternating, hexagonal, close-packed pattern, increasing the number of tubes in a given area. The higher density of tubes can promote thorough mixing between the two propellants as they enter the combustion chamber. The tubes and channels may be arranged around a central area where no tubes or channels are formed. This central area can improve combustion stability by reducing feedback between the injector and the pressure waves in the combustion chamber. The tubes and channels may be arranged inside a perimeter section of the lower plate. This perimeter area may have an angled or conical shape to diffuse or scatter the pressure waves propagating through the combustion chamber, to further improve combustion stability. In one embodiment of the invention, the tubes may include mechanisms for introducing a rotational velocity, often termed swirl, into the oxidizer flow to improve the mixing of the oxidizer and fuel in the chamber. These and other features of the invention will be described in further detail below.

While the following description refers to liquid propellants, the invention may be utilized with any combination of liquid and gas propellants. Thus, the invention may be used with a gas-liquid, gas-gas, liquid-gas, liquid-liquid, and any combination of these types of rocket engines. The references below to liquid propellants are illustrative and are not intended to be limiting in any way.

Referring to FIGS. 3a and 3b, the injector includes an upper plate 312 (e.g., an oxidizer plate) spaced apart from a lower plate 314 (e.g., a fuel plate), with a fuel plenum 326 between the two plates. The fuel plenum 326 is closed out by an attachment mechanism (see FIGS. 4a-4b) that connects the upper plate 312 to the lower plate 314. Injector tubes 316 extend from the oxidizer manifold 330 through the upper plate 312 and the fuel plenum 326 into channels 318 formed in the lower plate 314. The tubes 316 have a length to outside diameter ratio of approximately 6 or higher. Each channel 318 has a diameter that is greater than the outside diameter of the corresponding tubes 316, such that the tubes extend into the channels 318 leaving an annular region 319 between the tubes and the lower plate 314. The ratio of the outside diameter of the tubes to the diameter of the channels can vary depending on the density and mixture ratio of the propellants. The fuel 322 flows through this annular region 319 into the combustion chamber 328.

The tubes 316 do not need to be exactly centered within the channels 318. The oxidizer flow through the tubes remains steady without exact centering, and the micro-coaxial tubes remain centered more easily than the larger tubes of prior art coaxial injectors. Thus, the micro-coaxial injector does not require complicated centering mechanisms to center the tubes 316 in the channels 318. The number and dimensions of tubes 316 and channels 318 can vary with the desired thrust for the rocket engine. Each tube/channel pair may be referred to as an injector element.

While the two plates 312, 314 are described herein as "upper" and "lower" plates, this terminology is used solely for clarity in reference to the figures, and is not meant to limit the orientation or configuration of the plates 312, 314 in any way.

In operation, the first propellant 320, typically but not necessarily an oxidizer, flows from the oxidizer manifold 330 through the tubes 316 and into the combustion chamber 328. The oxidizer may be liquid oxygen, nitrous oxide, or another suitable oxidizer. Meanwhile, the second propellant 322, typically but not necessarily a fuel, is injected through the fuel plenum 326 and through the annular regions 319 into the combustion chamber 328. The fuel may be kerosene, gaseous or liquid hydrogen, gasoline, alcohol, gaseous or liquid methane, gaseous or liquid ethane, or another suitable fuel. Although, for convenience, the first propellant 320 is described below as an oxidizer and the second propellant 322 is described below as a fuel, the two propellants may be reversed, such that the fuel is the first propellant 320 and the oxidizer is the second propellant 322. The colder propellant is often injected as the first propellant 320 through the tubes 316.

At the end of the tubes 316, the oxidizer 320 mixes with the fuel 322 as the two propellants enter the combustion chamber 328. The injector forms the flow of oxidizer and fuel into smaller streams that can be more easily mixed together than the larger streams of oxidizer and fuel in prior art injectors. In the micro-coaxial injector, the oxidizer stream and the annular fuel stream have more exposed surface area, which allows them to atomize more rapidly and mix together more completely as they enter the combustion chamber 328, thereby promoting more efficient combustion.

Figure 4A:
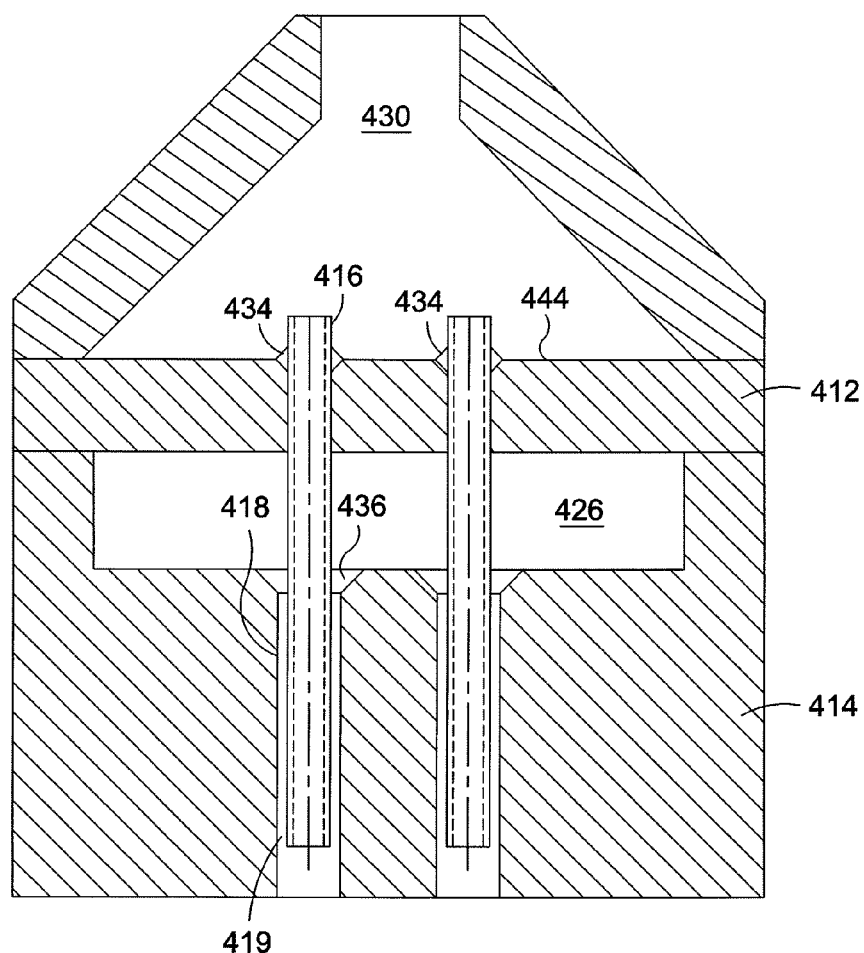
FIG. 4a is a cross-sectional side view of an injector according to one embodiment of the invention.
Figure 4B:
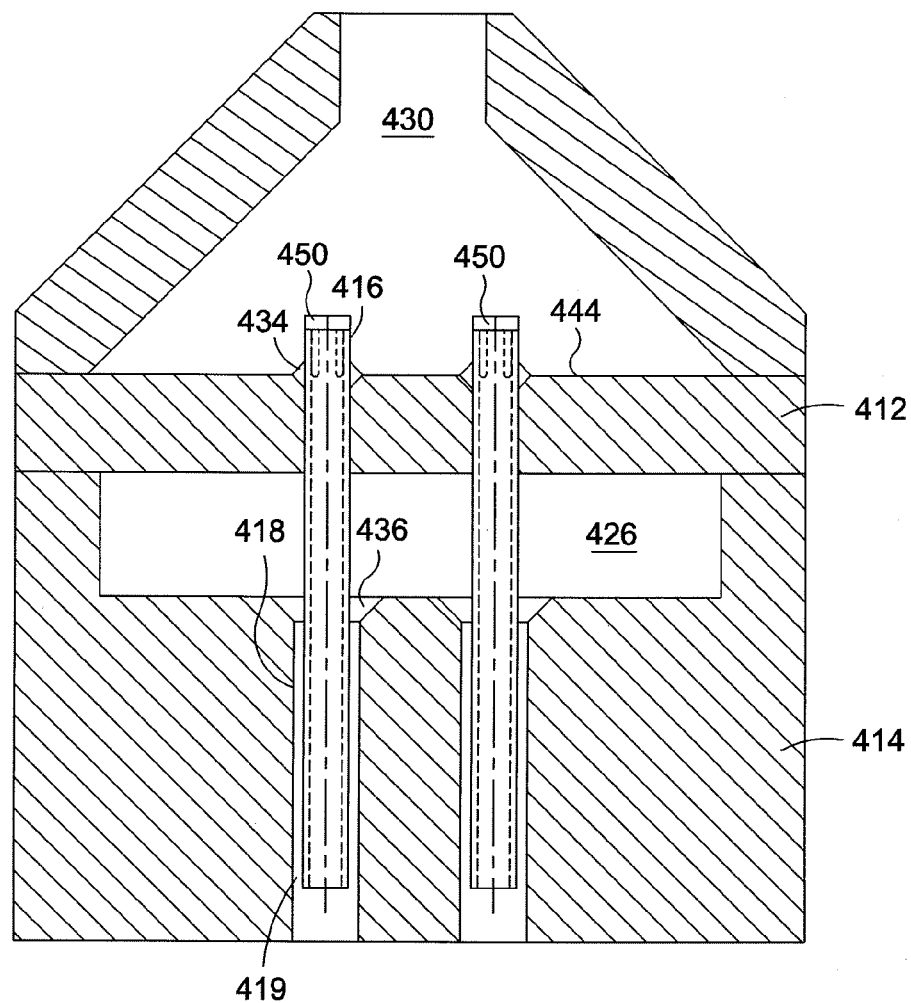
FIG. 4b is a cross-sectional side view of an injector with a swirl feature according to one embodiment of the invention.

Referring to FIGS. 3b and 4a-b, the tubes 316 extend past the top surface 344 of the upper plate 312 into the oxidizer manifold 330. These tubes 316 are reentrant tubes, extending into the manifold 330 instead of being flush with the top surface 344. In FIG. 3b, the tube 316a extends past the surface 344 by a distance D1. This distance is not critical, and it may vary considerably in different embodiments. In the embodiment shown, the distance D1 is roughly equal to the outside diameter of the tubes 316. This distance may be anything greater than about ⅓ of the outside diameter of the tubes. However, the distance may vary in other embodiments, and it may vary among the different tubes in the same embodiment. Thus, the tube 316a on the left in FIG. 3b may extend into the manifold 330 by a distance D1, while the tube 316b on the right in FIG. 3b extends into the manifold by a greater distance D2. The reentrant tubes 316 do not all have to be manufactured to exactly the same length so that they all line up flush with the top surface 344 or all to extend to the same distance D1. The oxidizer flow is not sensitive to variations in the heights D1 and D2 of the tubes 316 above the top surface 344, so the manufacturing tolerances for the tubes 316 may be increased. Thus, the reentrant tubes 316 may be significantly easier to manufacture than prior art tubes.

Additionally, the tubes 316 do not all have to share the same outside diameter. The outside diameter of each tube 316 should be less than the diameter of the corresponding channel 318, but the tubes 316 do not all have to share the same precise outside diameter. The flexibility in the outside diameter of each tube 316 further improves the manufacturing tolerances of the microcoaxial injector 300. The varying diameters of the tubes also allows the fuel to oxidizer ratio to be adjusted as desired to control the mixture of fuel and oxidizer entering the combustion chamber.

Another benefit of the micro-coaxial injector of the present invention is the ability to disassemble and reassemble the components. In the embodiment shown in FIGS. 3a and 3b, the long tubes 316 extend all the way through the lower plate 314 and do not need to be centered exactly through the channels 318. The upper plate 312 does not need to be permanently bonded to the lower plate 314 to hold all the components in place in the proper configuration. Instead of brazing, welding, or otherwise permanently bonding the two plates together, they can simply be clamped or screwed together, and unclamped or unscrewed for easy disassembly.

In one embodiment, the reentrant tubes 316 can be welded, soldered, electroplated, anodized, or brazed to the upper plate 312 with a fillet of metal 334. The upper plate 312 includes a chamfer 332 formed around each tube 316 to facilitate this brazing. Because the oxidizer 320 is flowing into the tubes at a distance D1 or D2 above the top surface 344 of the upper plate 312, the oxidizer flow is not sensitive to what happens at the top surface 344 of the upper plate 312. Thus, the fillets 334 may protrude into the manifold 330, may have rough or imperfect edges, and may have varying sizes and contours, without negatively affecting the oxidizer flow. The oxidizer flow is also less sensitive to disturbances caused by the shape of the top of the tubes 316 when they are reentrant than when they are flush with the top surface 344. When the tubes are flush, the rough or rounded edge of the top of each tube where it meets the top surface 344 can change the flow resistance. The flow is less sensitive to variations in the edges of the reentrant tubes.

While the resistance of the oxidizer flow is less sensitive to these variations in the reentrant tubes, the flow resistance is higher (i.e., the discharge coefficient is lower) in reentrant tubes than in flush tubes. Thus, in order to obtain the same rate of oxidizer flow, the reentrant tubes 316 will have a larger diameter than flush tubes. For example, the diameter may be increased by about 10-20%. The channels 318 may also be increased in diameter to accommodate the larger tubes without restricting fuel flow through the annular regions 319. The reentrant design can include a greater number of tubes 316 to obtain the same oxidizer flow rate without increasing the diameter of each tube. That is, the number of tubes 316 is not a fixed number but may be varied according to each individual rocket design. Both the number of tubes 316 and the diameter of the tubes may be varied to obtain the desired oxidizer flow rate.

In one embodiment of the present invention, the lower plate 314 includes countersinks or chamfers 336 formed in the top surface 346 of the lower plate 314 around the channels 318, as shown in FIG. 3b. The chamfers 336 facilitates assembly of the tubes 316 and lower plate 314 by increasing the initial opening through which the tubes extend. When the injector is assembled, the tubes 316 are inserted into the channels 318. Without the chamfers 336, the tubes 316 all have to line up exactly with their respective channels 318 before they can be slid into place. The chamfers 336 help guide the tubes 316 into the channels 318, making it easier to insert all of the tubes into their respective channels 318. The chamfers 336 also have the effect of increasing the flow coefficient of the annular regions 319 around the channels 318. The increased flow coefficient reduces the required size of the channels for a given fuel flow.

In one embodiment, the tubes 316 are set back from the bottom face 348 of the lower plate 314 by a distance D3. This setback distance can affect the performance of the injector, and can be adjusted for each individual rocket engine according to the desired thrust and other characteristics and uses of the particular engine. The setback distance D3 will generally fall between a positive setback of approximately ½ of the outside diameter of the tubes 316 to a negative setback (where the tubes 316 extend past the bottom face 348 of the lower plate 314 into the combustion chamber 328, not shown) of approximately ⅛ of the outside diameter of the tubes 316.

FIG. 4a shows a simplified view of a micro-coaxial injector according to an embodiment of the invention. For clarity, only two tubes 416 are shown in the injector, but in practice the injector can include more than two tubes 416. FIG. 4b shows another simplified view of a micro-coaxial injector in an exemplary embodiment of the invention, with tubes 416 including a swirl feature. The tube caps 450 are used to introduce swirl into the tubes 416, as discussed more fully below in connection with FIGS. 7a-7b.

Figure 1C:
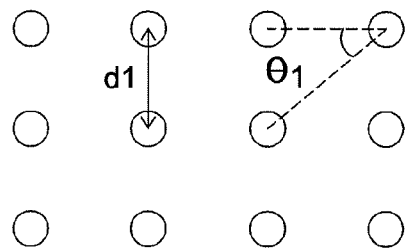
FIG. 1c is a schematic representation of an injector tube pattern of the prior art.

FIG. 1c is a schematic representation of an injector tube pattern of the prior art. As shown in FIG. 1c, prior art coaxial injectors arranged the tubes and channels in a square or non-alternating pattern, in which each tube is directly below the tube above it. The tubes in the second row are thus spaced apart from the tubes in the first row by a distance d1. The angle θ1 between the two rows is approximately 45°.

Figure 5:
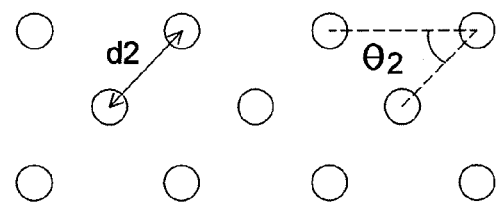
FIG. 5 is a schematic representation of an injector tube pattern according to one embodiment of the invention.

FIG. 5 is a schematic representation of an injector tube pattern according to one embodiment of the invention. As shown in FIG. 5, the tubes are arranged in a closely packed hexagonal or alternating pattern, in which each tube is positioned between the two tubes above it. Each row of tubes alternates placement with respect to the row above it. The angle θ2 separating the two rows is approximately 60°. The tubes in the second row are spaced apart from the tubes in the first row by a distance d2. By modifying the pattern to the alternating pattern shown in FIG. 5, the resulting distance d2 is less than the distance d1. That is, the smaller spacing d2 is a result of the alternating pattern, which packs the tubes closer together than the prior art square pattern. Thus, the alternating pattern has a higher number of tubes in a given area than the square, non-alternating pattern of the prior art. A higher density of tubes can improve mixing of the oxidizer and fuel in the combustion chamber by improving the mixing between adjacent injector elements.

Figure 6A:
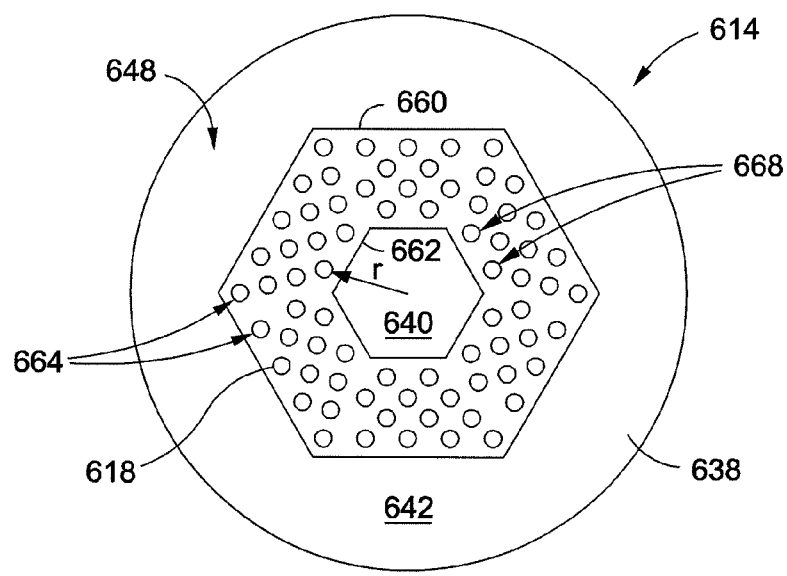
FIG. 6a is a bottom view of an injector according to one embodiment of the invention.
Figure 6B:
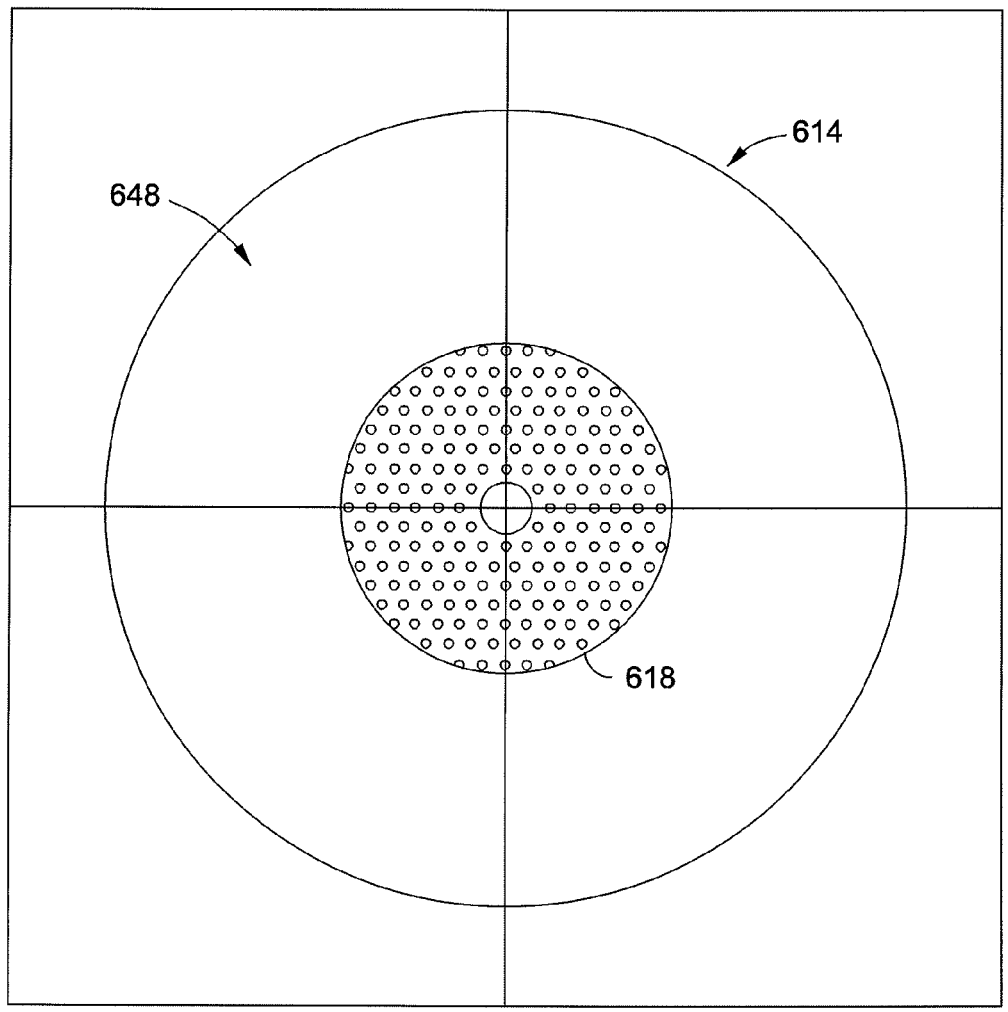
FIG. 6b is a bottom view of an injector according to one embodiment of the invention.
Figure 6C:
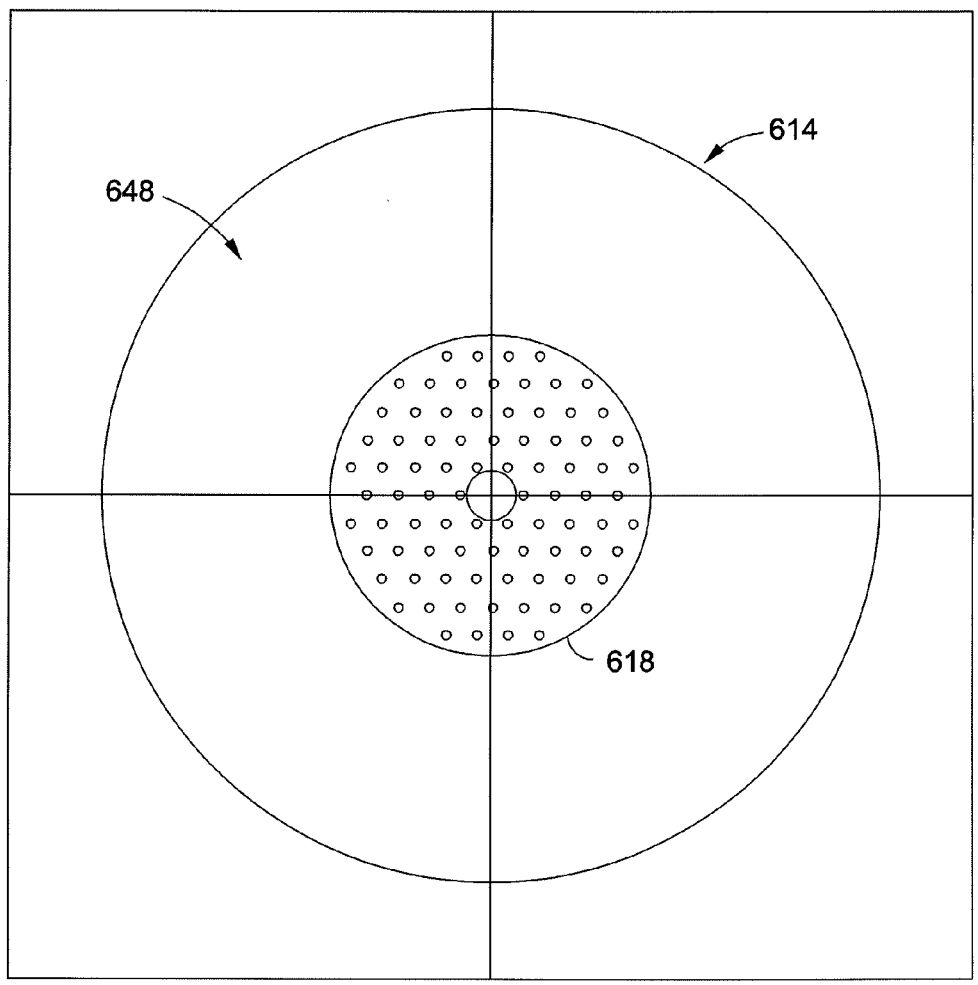
FIG. 6c is a bottom view of an injector according to one embodiment of the invention.

FIG. 6a shows a bottom view of an injector according to one embodiment of the invention. For clarity, only the channels 618, and not the corresponding tubes, are shown in FIG. 6a. As shown in FIG. 6a, the channels 618 are closely packed in a hexagonal or alternating pattern. The channels 618 are also grouped into a hexagonal shape on the bottom face 648 of the lower plate 614, as shown by the hexagonal outer perimeter 660. The hexagonal packing pattern may be trimmed to approximate a circular pattern, as shown in FIGS. 6b and 6c. The hexagonal shape is not mandatory and may be varied in other embodiments. This hexagonal shape is also not to be confused with the hexagonal, alternating arrangement of the tubes and channels, which is demonstrated in FIG. 5 and is not dependent on the overall shape of the tubes and channels. In the embodiment shown in FIG. 6a, the group of tubes and channels has a hexagonal outer perimeter 660 and a hexagonal inner perimeter 662.

The channels 618 in the outer row 664 may have a different diameter than the channels in the inner row 668, as shown in FIG. 6a. The larger channels in the outer row 664 are closest to the walls of the rocket's combustion chamber. Increasing the diameter of these channels will allow more fuel to flow through the channels into the combustion chamber, providing a more fuel-rich mixture where these outer channels empty into the combustion chamber. A more fuel-rich mixture can reduce the heating of the nearby combustion chamber walls. The channels 618 in each row have substantially the same diameter, but this diameter may vary between rows. These rows may also be defined by the radius r from the center of the lower plate 614. Thus, the diameter of the channels is constant at a given radial position, but may vary with radius. This allows the mixture of fuel and oxidizer to be controlled in an axi-symmetric manner, giving it circular symmetry across the lower plate 614. In addition, or alternatively, the outside diameter of the tubes may also be varied such that the tubes in each row have the same diameter, but the tubes in different rows have different diameters. To provide a fuel-rich mixture at the outside perimeter, the diameter of the tubes can be decreased, thus allowing more fuel to flow through the channel around the tubes.

The hexagonal inner perimeter 662 defines a solid center area 640, which is void of any tubes or channels. This center area 640 provides a solid structural area which can be used to attach the upper plate 612 to the lower plate 614 without obstructing the flow of fuel or oxidizer. The existence of this central area can reduce the overall mass of the injector by reducing the necessary thickness of the upper and/or lower plates. The fuel and/or upper plates need not be as thick in this embodiment, because the solid central area 640 provides structural support mid-plate.

The solid center 640 also improves combustion stability. As explained above, combustion instability arises when pressure oscillations resonate in the combustion chamber and grow due to positive feedback from the injector. When pressure builds inside the combustion chamber, a pressure wave travels up through the chamber towards the injector and fuel and oxidizer reservoirs. This pressure increase reduces the relative pressure difference between the fuel and oxidizer reservoirs and the chamber, thereby reducing the flow of oxidizer and fuel into the chamber. When the fuel flow decreases, the pressure in the chamber drops. The pressure drop then causes an increase in the flow of fuel and oxidizer into the chamber, leading to another buildup of pressure. The solid center area 640 can reduce this positive feedback by reducing the interaction between the fuel and oxidizer flow and the pressure wave inside the chamber. The solid center reduces the positive feedback by not contributing any propellant flow in the center of the chamber. A common mode of pressure oscillations in the chamber is the mode with an antinode at the center; that is, the largest pressure variations are in the center of the chamber. When injection takes place at the antinode in the center of the pressure wave, positive feedback from the injector amplifies combustion instability. The solid center 640 removes all injectors from the center of the chamber, and thus reduces the magnitude of positive feedback that tends to sustain the pressure oscillation at the center. Without any interaction between the pressures wave and the fuel flow at the center, the pressure wave amplitude is reduced. Thus, the non-uniform distribution of tubes and channels on the injector face improves combustion stability.

As shown in FIG. 6a, one embodiment of the injector includes a solid perimeter section 642 between the hexagonal outer perimeter 660 and the outer edge of the lower plate 614. This solid perimeter 642 also helps to improve combustion stability by reducing feedback between the injectors and the pressure waves inside the combustion chamber. The tubes and channels cover a fraction of the area of the bottom face 648 of the lower plate 614, and the remainder is occupied by the solid perimeter section 642 and the solid center section 640.

Figure 2A:
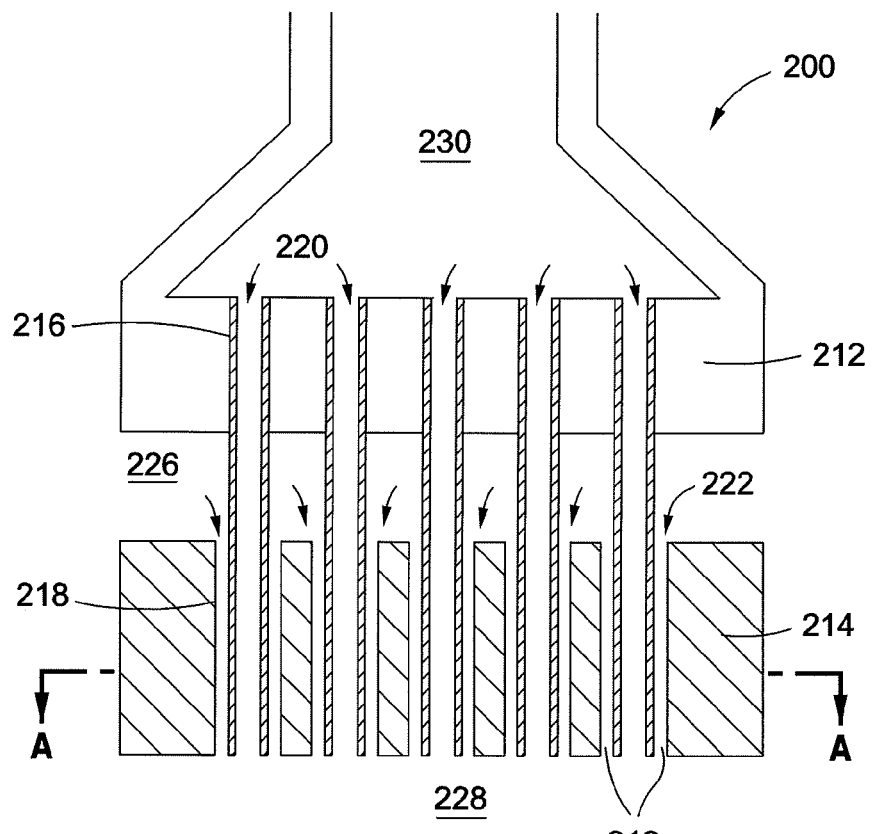
FIG. 2a is a cross-sectional side view of a prior art micro-coaxial injector.
Figure 2B:
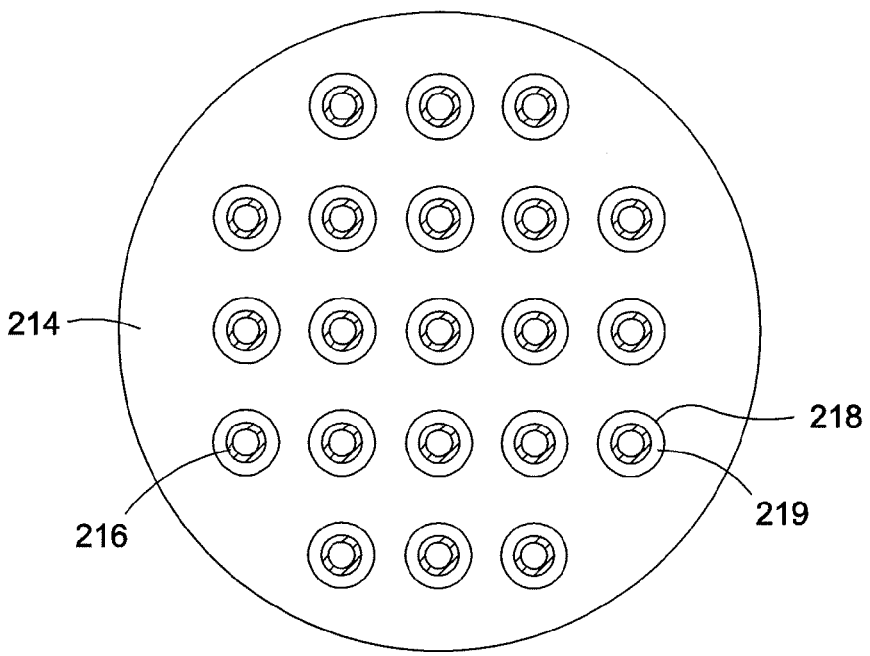
FIG. 2b is a cross-sectional top view of the prior art micro-coaxial injector of FIG. 2a taken along the line A-A.

A portion 338 of the perimeter section may be angled with respect to the center area and the area covered by the tubes and channels on the bottom face 348 of the lower plate 314. This angled or conical portion 338 is visible in FIG. 3a. The angle $\beta$ of this conical portion 338 may vary between just over zero degrees to about forty degrees. Prior art coaxial injectors used a flat bottom surface without any conical portion, as shown in FIG. 2a. The conical portion 338 can improve combustion stability by deflecting the pressure wave traveling through the combustion chamber, further reducing positive feedback between the chamber and the injector. The wave traveling through the chamber is deflected and thereby diffused when it impacts the conical portion 338. The conical shape can also reduce the overall mass of the injector because the conical shape is more efficient than a flat shape for forming the end of a pressure vessel. However, the conical shape is optional, and in other embodiments the perimeter section may not be angled.

Figure 7A:
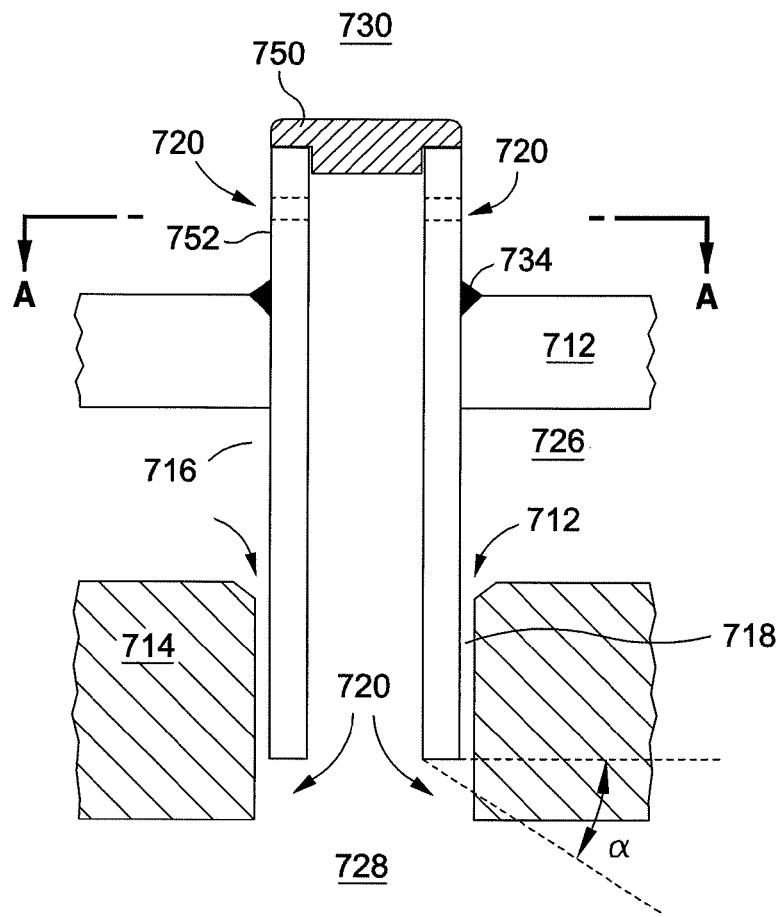
FIG. 7a is a cross-sectional side view of an injector with a swirl feature according to one embodiment of the invention.
Figure 7B:
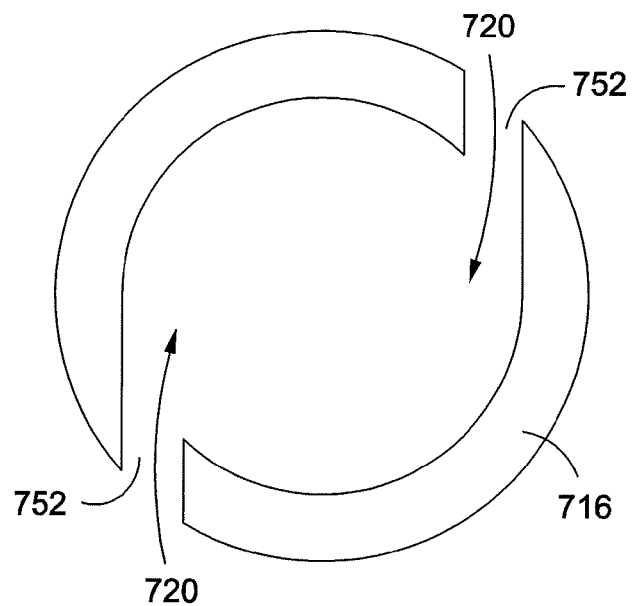
FIG. 7b is a cross-sectional top view of the injector tube of FIG. 7a taken along the line A-A.

FIGS. 7a and 7b show an injector with a swirl feature according to one embodiment of the invention. Referring to FIGS. 7a and 7b, the tubes 716 may include a mechanism for introducing a rotational velocity, often called swirl, into the oxidizer flow. Swirl improves the mixing of the oxidizer and fuel and provides better combustion efficiency. When swirl mechanisms are used, they are typically, but not necessarily, introduced in all tubes 716 because implementation of swirl in some but not all tubes may cause uneven mixing. Mechanisms for introducing swirl have been used in prior art coaxial post injectors. However, the smaller relative sizes of micro-coaxial tubes require new implementations of swirl mechanisms that are feasible within the manufacturing constraints of these small sizes.

In the embodiment shown in FIG. 7a, one or more tangential slots 752 are formed in the tube 716. A cap 750 is brazed, welded, pressed, friction fit, or otherwise attached on the top opening of the tube 716, sealing the top opening from the oxidizer flow. When the flow is no longer able to enter the tube through the top of the tube, the oxidizer 720 enters the tube 716 through the slots 752. The tangential slots 752 open along the side of the tube, not the center of the tube, as shown in FIG. 7b. Because the slots do not point at the center, the oxidizer enters the tube from the slots with a tangential velocity. The slots thus impart a rotational velocity to the oxidizer flow. At the opposite end of the tube, the rotational flow exits the tube with a shallower angle $\alpha$, as measured from the horizontal in the figure, than it would without the swirl feature. The smaller, shallower angle $\alpha$ promotes more rapid and thorough mixing between the oxidizer and the fuel.

Figure 8A:
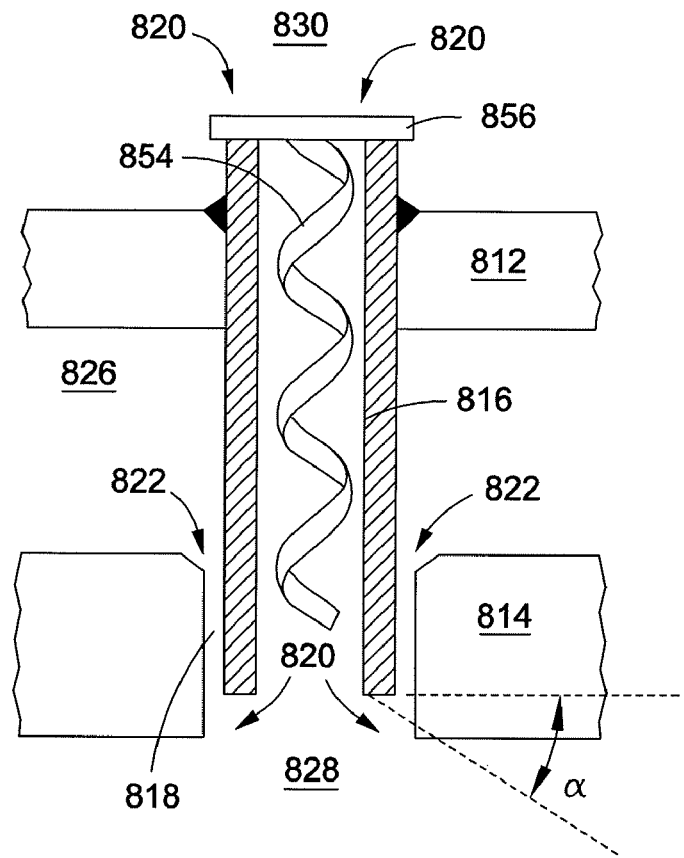
FIG. 8a is a cross-sectional side view of an injector with a swirl feature according to one embodiment of the invention.
Figure 8B:
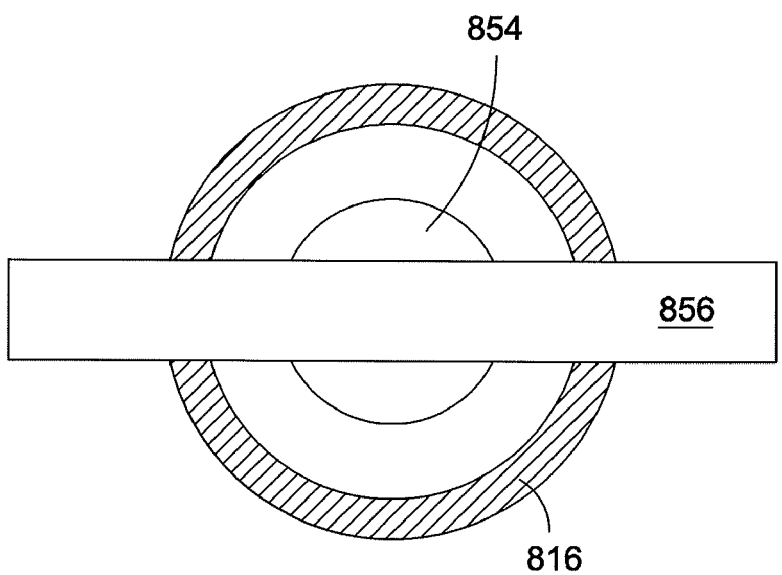

FIGS. 8a and 8b show an injector with a swirl feature according to one embodiment of the invention. Referring to FIGS. 8a and 8b, one embodiment of an injector with a swirl mechanism includes a helix or coil 854 inserted into the tube 816. The helix 854 is attached to a crosspiece 856 which extends across the top of the tube 816. The helix 854 may be formed of a twisted piece of metal foil or other similar materials. The helix 854 imparts a rotational velocity to the oxidizer flow 820 as it flows down the length of the tube 816. The oxidizer flow then exits the tube 816 with a shallower angle $\alpha$ than it would otherwise.

Although limited embodiments of the rocket engine injector have been specifically described and illustrated herein, many modifications and variations will be apparent to those skilled in the art. Accordingly, it is to be understood that the injector constructed according to principles of this invention may be embodied other than as specifically described herein. The invention is also defined in the following claims.

What is claimed is:

1. A micro-coaxial injector for a rocket engine having a combustion chamber, the micro-coaxial injector comprising:
    a first plate having a first surface and an opposite second surface;
    a plurality of channels formed in a first annular portion of the first plate, wherein the first plate comprises a solid section radially inside the first annular portion, the solid section being devoid of such channels;
    a second plate having a first surface facing the first surface of the first plate and having a second surface facing opposite the first plate; and
    a plurality of tubes extending through the second plate and into the plurality of channels and configured to inject a first propellant into the combustion chamber, each of the plurality of tubes extending past the second surface of the second plate,
    wherein the plurality of channels is configured to inject a second propellant into the combustion chamber,
    wherein the second surface of the first plate comprises a second annular portion radially outside the first annular portion, and wherein the second annular portion is angled with respect to the first annular portion, and
    wherein the first surface of the first plate facing the second plate comprises a chamfer formed around each of the plurality of channels.

2. The micro-coaxial injector of claim 1, wherein each of the plurality of tubes extends past the second surface of the second plate by more than approximately ⅓ of an outside diameter of each of the plurality of tubes.

3. The micro-coaxial injector of claim 1, further comprising a plenum between the first plate and the second plate configured to inject the second propellant into each of the plurality of channels.

4. The micro-coaxial injector of claim 1, wherein each of the plurality of channels has a length, and wherein each of the plurality of tubes has a portion extending into a corresponding one of the plurality of channels, the portion having a length, and wherein the length of the portion is less than the length of the corresponding one of the plurality of channels.

5. The micro-coaxial injector of claim 1, wherein the second surface of the second plate comprises a second chamfer formed around each of the plurality of tubes.

6. The micro-coaxial injector of claim 5, further comprising a metal fillet attaching a respective one of the plurality of tubes to a respective second chamfer.

7. The micro-coaxial injector of claim 1, wherein each of the plurality of tubes has a length to outside diameter ratio greater than approximately 8.

8. The micro-coaxial injector of claim 7, wherein the length to outside diameter ratio is approximately 10.

9. The micro-coaxial injector of claim 1, wherein each of the plurality of tubes has an outside diameter, and wherein the outside diameter of a first one of the plurality of tubes is different from the outside diameter of a second one of the plurality of tubes.

10. The micro-coaxial injector of claim 1, wherein the first propellant is an oxidizer and the second propellant is a fuel.

11. The micro-coaxial injector of claim 10, wherein the oxidizer is selected from the group consisting of liquid oxygen and nitrous oxide.

12. The micro-coaxial injector of claim 11, wherein the fuel is selected from the group consisting of kerosene, gaseous hydrogen, liquid hydrogen, gasoline, alcohol, gaseous methane, liquid methane, gaseous ethane, and liquid ethane.

13. An injector for a rocket engine having a combustion chamber, the injector comprising:
 a first plate having a solid center section;
 a plurality of channels formed in the first plate and arranged in a plurality of rows around the solid center section of the first plate, with an innermost row of channels being closest to the solid center section, and with the solid center section located radially inside the innermost row;
 a second plate; and
 a plurality of tubes extending through the second plate and into the plurality of channels and configured to inject a first propellant into the combustion chamber, wherein the plurality of channels is configured to inject a second propellant into the combustion chamber, and wherein the second plate comprises a chamfer formed around each tube.

14. The injector of claim 13, wherein the center section of the first plate has a hexagonal shape.

15. The injector of claim 13, wherein the plurality of channels is arranged in a hexagonal shape.

16. The injector of claim 13, wherein the first plate further comprises a perimeter section and wherein the plurality of channels is arranged inside the perimeter section of the first plate.

17. An injector for a rocket engine having a combustion chamber, the injector comprising:
 a first plate having a center section inside a perimeter section;
 a plurality of channels formed in the first plate inside the perimeter section of the first plate;
 a second plate having a first surface facing the first plate and a second surface facing opposite the first plate; and
 a plurality of tubes extending through the second plate and into the plurality of channels and configured to inject a first propellant into the combustion chamber, each of the plurality of tubes extending past the second surface of the second plate,
 wherein the first plate comprises a top surface facing the second plate and a bottom surface opposite the top surface, the bottom surface comprising the center section and the perimeter section, and wherein the perimeter section of the bottom surface is angled with respect to the center section, and
 wherein the plurality of channels is configured to inject a second propellant into the combustion chamber.

18. A micro-coaxial injector for a rocket engine having a combustion chamber, the micro-coaxial injector comprising:
 a first plate;
 a plurality of channels formed in the first plate;
 a second plate having a first surface facing the first plate and a second surface facing opposite the first plate; and
 a plurality of tubes extending through the second plate and into the plurality of channels and configured to inject a first propellant into the combustion chamber and configured to impart a rotational velocity to the first propellant,
 wherein the second plate comprises a chamfer formed around each tube,
 wherein each of the plurality of tubes further comprises a tangential slot through a side of the tube to impart such rotational velocity to the first propellant, and
 wherein the plurality of channels is configured to inject a second propellant into the combustion chamber.

19. The micro-coaxial injector of claim 18, wherein each of the plurality of tubes further comprises:
 a top portion extending past the second surface of the second plate and having a top end;
 a cap sealing the top end of the top portion; and
 wherein the tangential slot is formed in the top portion.

20. The micro-coaxial injector of claim 18, further comprising a helix inside each of the plurality of tubes.

21. The micro-coaxial injector of claim 20, wherein the helix is constructed from metal.

\* \* \* \* \*